April 1, 1941.  S. T. WILLIAMS  2,236,587
TIRE VALVE
Filed March 2, 1939
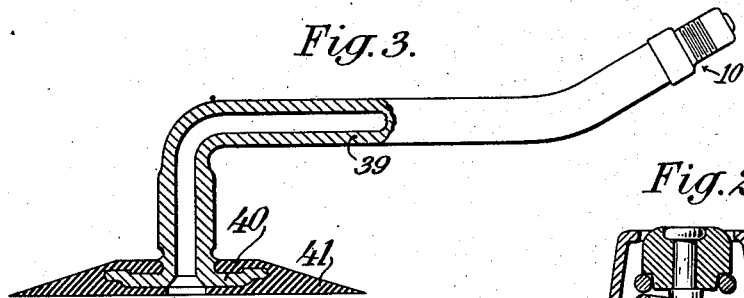
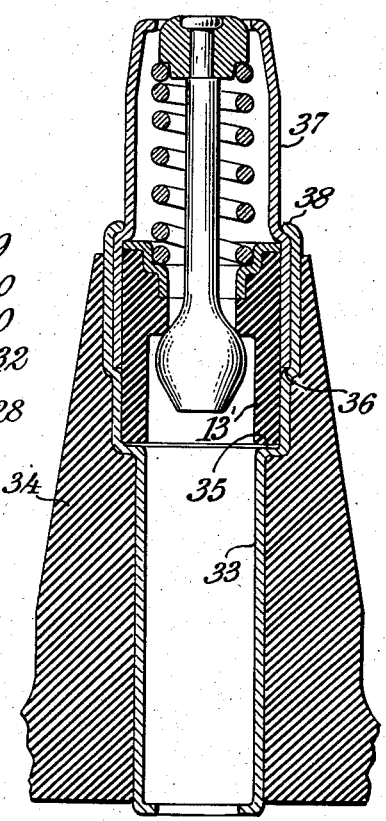
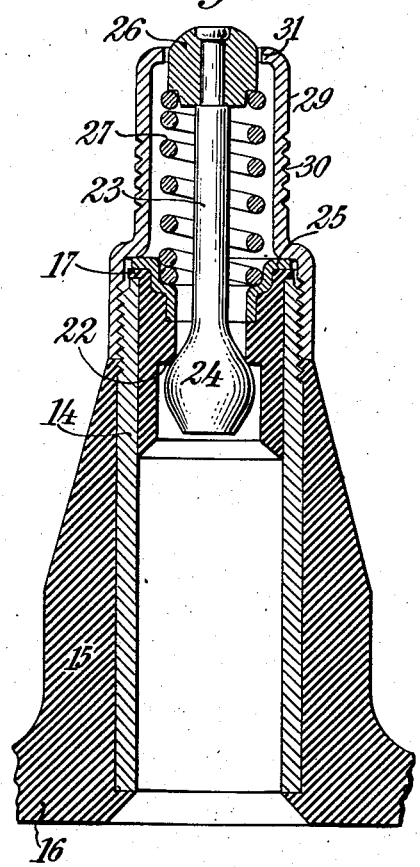
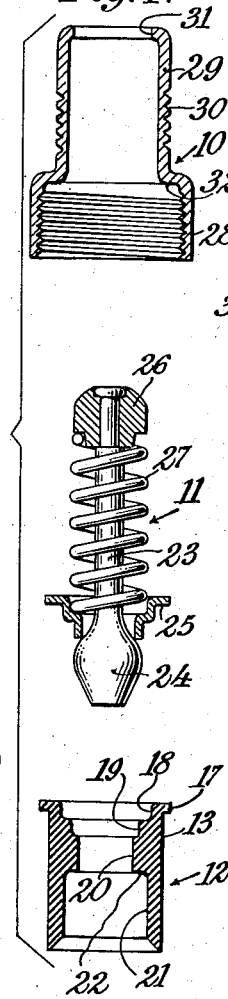
INVENTOR
*Selden T. Williams,*
BY
*Fraser, Myers & Manley.*
ATTORNEYS.

Patented Apr. 1, 1941

2,236,587

UNITED STATES PATENT OFFICE 2,236,587

TIRE VALVE

Selden T. Williams, Bellerose, N. Y., assignor to Scovill Manufacturing Company, Waterbury, Conn., a corporation of Connecticut Application March 2, 1939, Serial No. 259,304

1 Claim. (Cl. 277—42)

My present invention relates to tire valves and aims to provide certain improvements therein.

Almost all tire valves in use at present consist of a valve stem or casing having therein a valve check mounted on a pin which extends to the top of the casing for engagement with the depressing pin of an inflating chuck or pressure gauge. Such tire valves are customarily fitted with a valve cap to prevent ingress of moisture and foreign matter to the valve parts and for serving as a secondary air seal for the valve check. To avoid the necessity of removing the cap every time it is desired to inflate, deflate or gauge the tire, it has been proposed to substitute for the conventional valve cap what is known as an inflating cap, that is, a cap through which the tire can be inflated, deflated and gauged. These inflating caps, however, add substantially to the length of the tire valve and to the cost thereof.

It has also been proposed, in order to reduce the cost of the tire valve, to make the valve stems or casings substantially entirely of rubber and to integrally form therein a valve seat for the check valve. Owing, however, to the desirability of having the rubber valve seat and the rubber valve stem of different rubber compositions because of the different functional characteristics of said parts, and because further of the desirability of having the valve check parts replaceable, the rubber valve stem with an integral rubber seat has not as yet won the favor of the tire manufacturers.

It is an object of the present invention to provide a tire valve which will have the features of an inflating cap without materially adding to the length of the tire valve stem and which will embody the desirable characteristics of a compressible rubber valve seat within the valve stem such that the manufacturing costs of the tire valve as a whole can be substantially reduced. A further object is to provide a valve stem with a valve seat which can be readily replaced should it become defective, without discarding the entire valve stem.

The foregoing and other objects not specifically enumerated are accomplished by providing in a tire valve a separate replaceable rubber valve seat which is independent of the valve check and embodying the valve check in a cap-like member which serves the dual function of holding the valve seat within the casing and of providing a closure for the tire valve through which the tire can be inflated, deflated and gauged. My valve construction has the further advantage that the valve casing can be cured onto an inner tube or the like before the valve seat or check is mounted therein, thereby greatly facilitating and expediting the curing-on operation. The invention will be better understood from the detailed description which follows when considered in connection with the accompanying drawing showing several embodiments of my invention, and wherein:

Figure 1 is a longitudinal section embodying my invention.

Fig. 2 is a similar view of a slight modification of my invention.

Fig. 3 is a side elevation with parts broken away showing the application of my invention to a double bent valve stem.

Fig. 4 is a composite view of the constituent parts constituting the essence of my invention.

Referring first to Fig. 4, the invention may be said to consist of a valve cap member 10, a spring pressed valve check 11, and a compressible valve seat member 12.

The valve seat member 12 preferably consists of a tubular sleeve of rubber or other compressible material 13, having a substantially cylindrical outer wall of a diameter to snugly fit within the bore of a tire valve stem or casing 14, which latter may be of any preferred construction, for example as shown in Fig. 1 where it is in the form of a tubular sleeve housed within a rubber casing 15, having a base flange 16 adapted to be vulcanized to the exterior of an inflated body such as a pneumatic tire tube or the like (not shown), the casing 14 being externally screw-threaded at its outer end to receive the valve cap 10. The rubber sleeve 13, at its top or outer end, is formed with a radial flange 17 which is adapted to seat on a shoulder or on the top or outer end of the casing 14. The sleeve 13 has a bore therethrough of different diameters, namely, 18, 19, 20 and 21, for purposes which will presently appear. Between the bores 20 and 21 there is a flat shoulder 22 which constitutes the valve seat proper of the tire valve and faces in the direction of the inner end of the tire valve casing.

The spring pressed valve check 11 consists of a valve pin 23 formed at one end with an enlarged bulbous or pear-shaped head 24 which constitutes the valve check proper. Loosely mounted on the valve pin is a spring seat 25 having a radial flange adapted to overlie the flange 17 on the rubber sleeve, and a tubular portion adapted to seat within the bores 18 and 19 of said sleeve. The pin 23, at its outer end, is slightly reduced in diameter and has non-removably mounted thereon an enlarged head or button 26, and disposed about said pin between said button 26 and the spring seat 25 is a coil spring 27.

The valve cap member 10 has an internally screw-threaded lower portion 28 to engage the threads of the tire valve casing, and a reduced upper portion 29 having annular recesses 30 in its wall for engagement by a snap-on type of inflating chuck. The top of the cap has a central opening 31 therethrough of a diameter but slightly larger than that of the button 26 and is adapted to receive said button to provide a substantial closure for the cap and guide the valve check onto its seat. Between the portions 28 and 29 of the cap there is formed a flat shoulder 32 which is adapted, in the course of screwing the cap onto the valve stem, to engage the flange of the spring seat 25 to hold said spring seat within the rubber sleeve 13 and compress the flange 17 of said sleeve into leak-tight engagement with the outer end of the valve casing 14.

In the application of my invention to a tire valve stem or casing, such as 14, the bulbous or pear-shaped head 24 constituting the valve check proper is forced through the bore 20 of the valve seat member into the bore 21 holding down on the button 26 during the insertion, whereupon the valve check will be held by the force of the spring 27 against the flat shoulder or valve seat 22. The rubber sleeve 13 is then inserted into the outer end of the casing. The cap 10 is then screwed onto the valve stem in the course of which the shoulder 32 will engage the flange of the spring seat and in turn force the flange 17 of the rubber sleeve into leak-tight engagement with the end of the valve stem. The compressive action upon the flange 17 will act as a sort of locknut to hold the valve cap in attached relation to the tire valve casing.

When the tire valve is thus assembled, the outward pressure of the bulbous portion of the valve check 24 against the valve seat, due to the tension of the spring 27 and the air pressure within the tire, will exert a radial pressure upon said tubular sleeve which will tend to prevent leakage between the sleeve and the casing and an axial pressure between the sleeve and the spring seat 25 which will augment this tendency to prevent leakage. The tubular portion of the spring seat 25, seating within the rubber sleeve 13, will reinforce the latter and prevent withdrawal of the valve check through the spring seat when the parts are in assembled relation.

A tire valve constructed in accordance with the foregoing it will be appreciated has the advantage of one wherein the maximum length of the stem can be reduced to a minimum, wherein the tire can be inflated, deflated and gauged through the casing without the need of a supplemental closure cap, and wherein the cost of the tire valve as a whole is substantially reduced by the elimination of the conventional metallic valve seat and screw-threaded plug for positioning said seat within the valve casing. Said tire valve also has the advantage over the so-called rubber valve stems having an integral valve seat in that should the valve seat or valve check prove defective, said parts can be removed and replaced with but little cost and the expenditure of but little time and without the necessity of stripping the entire valve stem off the tube.

In Fig. 2 of the drawing a type of valve construction quite similar to that hereinbefore described is disclosed, the said construction primarily differing from that shown in Fig. 1 in that instead of the valve cap member being removably mounted on the casing, the cap in this latter construction is semi-permanently attached to the casing. In this form of the invention the valve casing 33 is in the form of a drawn hollow shell which may be readily vulcanized within a rubber casing 34, the said shell having a suitable shoulder 35 for limiting the inward position of the rubber sleeve 13' into the casing. The casing has a second shoulder 36 for receiving the inner end of the valve cap 37 in the course of assembling the parts which may be semi-permanently united together by turning or spinning the free end 38 of the casing over a shoulder on the valve cap.

While the embodiment of the invention shown in Fig. 2 does not possess the characteristic of having the valve parts readily removable and replaceable, it does possess the advantage of greater cheapness in production cost and replaceability with special tools as can be understood by one versed in the art.

In Fig. 3 of the drawing the invention is shown as applied to a double bent valve stem 39, the base flange 40 of which is embedded in a rubber patch 41 adapted for direct attachment to a pneumatic tube. The form of tire valve which may be used with such bent valve stem may correspond to either of the embodiments shown in Figs. 1 and 2 depending upon whether or not the valve parts are to be readily replaceable.

While I have shown and described several embodiments of my invention, it is to be understood that I do not wish to be limited to the precise details of construction disclosed since these may be varied within the range of engineering skill without departing from the spirit of the invention.

What I claim is:

A tire valve comprising a rigid casing having a bore therethrough, a compressible tubular sleeve within said casing and snugly fitting within said bore, said sleeve having bores of different diameters forming a shoulder which constitutes the valve seat proper and faces toward the base of the casing, a non-deformable valve check of larger diameter than the bore of smallest diameter through the seat member for cooperation therewith insertable into said seat member through the bore of smallest diameter prior to insertion of the seat member within said casing, said valve check being mounted on a pin having an enlargement thereon in spaced relation to the valve check, a spring seat loosely mounted on said pin and having a part engageable within the sleeve above the seat proper to limit the expansion thereof and prevent the withdrawal of the valve check through the sleeve and provide an annular recess within said spring seat, a spring mounted on the valve pin and bearing at one end against the enlargement on said pin and at its other end seating within the annular recess in the spring seat and normally tending to hold the valve seated, and a cap member attached to the casing and having a part bearing against the spring seat for holding it in engagement with the valve seat member, said cap having a central opening in its top through which the enlargement on the valve pin may project and be guided to center the valve check on its seat and provide a substantial closure for the cap when the valve is seated.

SELDEN T. WILLIAMS.